(12) United States Patent
Young et al.

(10) Patent No.: US 10,704,502 B2
(45) Date of Patent: Jul. 7, 2020

(54) FUEL VAPOR SEPARATOR AND HEAT EXCHANGER FOR A MARINE OUTBOARD ENGINE

(71) Applicants: BRP US INC., Sturtevant, WI (US); WALBRO LLC, Cass City, MI (US)

(72) Inventors: Matthew James Young, Greendale, WI (US); Justin Johnson, Silver Lake, WI (US); Paul Westhoff, Jr., Kenosha, WI (US); Travis P. Baur, Bay Port, MI (US); Kevin L. Israelson, Cass City, MI (US); David D. Hacker, Bad Axe, MI (US); Nathan Blank, Burlington, WI (US); David Scott Soderman, Twin Lakes, WI (US)

(73) Assignees: BRP US INC., Sturtevant, WI (US); WALBRO LLC, Cass City, MI (US)

( * ) Notice: Subject to any disclaimer, the term of this patent is extended or adjusted under 35 U.S.C. 154(b) by 64 days.

(21) Appl. No.: 16/171,853

(22) Filed: Oct. 26, 2018

(65) Prior Publication Data

US 2020/0095959 A1 Mar. 26, 2020

Related U.S. Application Data

(60) Provisional application No. 62/736,234, filed on Sep. 25, 2018.

(51) Int. Cl.
*F02M 25/08* (2006.01)
*B60K 15/035* (2006.01)

(52) U.S. Cl.
CPC ...... *F02M 25/0854* (2013.01); *F02M 25/089* (2013.01); *F02M 25/0836* (2013.01); *F02M 25/0872* (2013.01); *B60K 15/03504* (2013.01)

(58) Field of Classification Search
CPC .......... F02M 25/0854; F02M 25/0836; F02M 25/0872; F02M 25/089; B60K 15/03504
See application file for complete search history.

(56) References Cited

U.S. PATENT DOCUMENTS 5,309,885 A * 5/1994 Rawlings .................. F01P 3/12
123/184.21
6,581,579 B1 6/2003 Knight et al.
(Continued)

OTHER PUBLICATIONS

Vapor Separator Tank. [online]. Performance Product Technologie; Mercury Marine Parts Catalog, 2018 [retrieved on Jul. 24, 2018]. Retrieved from the Internet: <URL:https://www.perfprotech.com/mercury-marine-parts-catalog/vapor-separator-tank.

*Primary Examiner* — Xiao En Mo
(74) *Attorney, Agent, or Firm* — BCF LLP

(57) ABSTRACT

A marine outboard engine includes an internal combustion engine including at least one fuel injector; a fuel vapor separator including: a separator body, a fuel reservoir defined by the separator body, and a first fuel pump fluidly connected between the fuel reservoir and the fuel injector; a fuel tank; and a second fuel pump fluidly connected between the fuel tank and the fuel vapor separator. The fuel vapor separator includes a heat exchanger disposed in the separator body. The heat exchanger includes at least one fuel channel defined by the heat exchanger body, the at least one fuel channel including: an inlet adapted for receiving fuel from the engine, and an outlet fluidly communicating with the fuel reservoir; and at least one coolant channel defined by the heat exchanger body, the at least one fuel channel and the at least one coolant channel being in thermal communication.

20 Claims, 14 Drawing Sheets

(56) References Cited

U.S. PATENT DOCUMENTS

| | | |
|---|---|---|
| 6,607,361 B1 | 8/2003 | Kotter et al. |
| 6,634,341 B2 | 10/2003 | Crary et al. |
| 6,655,366 B2 | 12/2003 | Sakai |
| 7,013,878 B1 * | 3/2006 | Cotton .................... F02M 37/20 |
| | | 123/41.31 |
| 7,827,970 B2 | 11/2010 | Smith et al. |
| 2002/0152998 A1 * | 10/2002 | Katayama ............. F02B 61/045 |
| | | 123/541 |
| 2004/0231648 A1 * | 11/2004 | Katayama .......... F02M 25/0836 |
| | | 123/541 |

* cited by examiner

FUEL VAPOR SEPARATOR AND HEAT EXCHANGER FOR A MARINE OUTBOARD ENGINE

CROSS-REFERENCE

The present application claims priority to United States Provisional Patent Application No. 62/736,234, entitled "Fuel Vapor Separator and Heat Exchanger for a Marine Outboard Engine," filed Sep. 25, 2018, the entirety of which is incorporated herein by reference.

TECHNICAL FIELD

The present technology relates to fuel systems for internal combustion engines and more particularly to fuel systems for marine outboard engines.

BACKGROUND

A typical marine outboard engine has an internal combustion engine for propelling the marine outboard engine. Fuel is delivered to fuel injectors in the engine via a fuel system that has one or more fuel pumps and a fuel vapor separator. A fuel pump draws fuel from a fuel tank and supplies it to the fuel vapor separator when fuel in the fuel vapor separator drops below a certain threshold. Another fuel pump delivers fuel from the vapor separator to the fuel injectors.

Not all the fuel pumped to the injectors is consumed by the internal combustion engine. A portion of the fuel pumped to the injectors is allowed to flow past the fuel injectors, which aids in cooling the fuel injectors. This fuel is returned to the fuel vapor separator.

The fuel returned from the injectors is typically warmer than fuel delivered to the fuel vapor separator from the fuel tank. Such returned fuel is therefore more volatile than cooler fuel, and may be foamy. Fuel in the fuel vapor separator, and especially the warmer fuel in the fuel vapor separator, produces fuel vapor. Fuel vapor is typically vented from a top part of the fuel vapor separator to the internal combustion engine's air intake, where it is consumed during the internal combustion engine's operation.

Some vapor separators have cooling lines running through the fuel often in spirals or some other shape with large surface contact areas to cool as much of the fuel as possible. If a marine outboard motor is to be cooled using the water surrounding the watercraft, complicated cooling lines can be susceptible to clogs or similar issues if debris from the water source enters the cooling lines. These complicated cooling line forms can further be difficult to manufacture.

Therefore, there is a desire to reduce the temperature of the fuel in the fuel vapor separator without at least some of the inconveniences described above.

SUMMARY

It is an object of the present technology to ameliorate at least some of the inconveniences present in the prior art.

In turn, for the purposes of this document, the term "line" refers to a physical line for conveying a fluid, such as gasoline or fuel vapor. One example of a fuel line is a fuel hose. Another example of a fuel line is a plastic tube.

For the purposes of this document, the term "fuel" refers to liquid fuel, fuel vapor alone, or a combination of fuel vapor and air. It is to be understood that the fuel can also include water vapor and other constituents.

According to one aspect of the present technology, there is provided a heat exchanger for a vapor separator in an outboard engine and a vapor separator including a heat exchanger. The heat exchanger cools fuel returning from hot rail as it enters the fuel vapor separator but before it enters the fuel reservoir within the vapor separator. It is disposed within the vapor separator and is not an additional component to be connected to the fluid line to minimize the additional components in the outboard. By being disposed in the vapor separator, the heat exchanger also provides some additional cooling to fuel contained in the fuel reservoir. The heat exchanger includes two long, connected parallel channels, through both of which the fuel flows, to extend the time the fuel flows through heat exchanger. In one of the channels, the fuel passes through the heat exchanger in counter flow to a coolant channel. The heat exchanger of the present technology, with straight and parallel fuel and coolant channels extending through the body of the heat exchanger lends itself to being extruded for cost-efficient manufacturing.

According to one aspect of the present technology, there is provided a fuel vapor separator for connecting to an engine, the fuel vapor separator including: a separator body; a fuel reservoir defined at least partially by the separator body; and a heat exchanger disposed at least partially in the separator body. The heat exchanger includes a heat exchanger body; at least one fuel channel defined by the heat exchanger body, the at least one fuel channel including: an inlet adapted for receiving fuel from the engine, and an outlet fluidly communicating with the fuel reservoir; and at least one coolant channel defined by the heat exchanger body, the at least one fuel channel and the at least one coolant channel being in thermal communication.

In some embodiments, the heat exchanger body is thermally conductive between at least the at least one fuel channel and the at least one coolant channel.

In some embodiments, the at least one fuel channel and the at least one coolant channel are parallel.

In some embodiments, the outlet of the at least one fuel channel opens into a bottom portion of the fuel reservoir.

In some embodiments, the at least one coolant channel includes a coolant inlet and a coolant outlet; and the coolant outlet is disposed vertically between the coolant inlet and the inlet of the at least one fuel channel.

In some embodiments, the at least one fuel channel includes a first fuel channel and a second fuel channel; the inlet of the at least one fuel channel is an inlet of the first fuel channel; the outlet of the at least one fuel channel is an outlet of the second fuel channel; and an outlet of the first fuel channel is fluidly connected to an inlet of the second fuel channel.

In some embodiments, the first fuel channel and the second fuel channel are parallel.

In some embodiments, the inlet of the first fuel channel and the outlet of the second fuel channel open in opposite directions; and the first and second fuel channels are disposed between the inlet of the first fuel channel and the outlet of the second fuel channel.

In some embodiments, the heat exchanger further comprises a connector connected to the heat exchanger body, the connector fluidly connecting the outlet of the first fuel channel to the inlet of the second fuel channel.

In some embodiments, coolant flowing through the at least one coolant channel flows in an opposite direction than fuel flowing through the second fuel channel; and coolant flowing through the at least one coolant channel flows in a same direction as fuel flowing through the first fuel channel.

In some embodiments, the fuel vapor separator further includes a fuel pump disposed at least partially in the fuel reservoir for supplying fuel from the fuel reservoir to the engine; and the heat exchanger and the fuel pump are disposed at least in part on opposite sides of the fuel reservoir.

In some embodiments, a cross-sectional area of the at least one coolant channel is greater than a cross-sectional area of the first fuel channel; and the cross-sectional area of the at least one coolant channel is greater than a cross-sectional area of the second fuel channel.

In some embodiments, the cross-sectional area of the at least one coolant channel is greater than a total of the cross-sectional areas of the first and second fuel channels.

In some embodiments, a cross-section of the at least one coolant channel is generally D-shaped; a cross-section of each of the first and second fuel channels is circular; and the first and second fuel channels are disposed next to a flat side of the D-shaped cross-section of the at least one coolant channel.

In some embodiments, the heat exchanger further comprises a heat exchange fin extending into the at least one coolant channel from the flat side of the D-shaped cross-section of the at least one coolant channel.

In some embodiments, the heat exchanger is at least partially disposed in the fuel reservoir; and the at least one coolant channel is in thermal communication with the fuel reservoir.

In some embodiments, the heat exchanger further comprises at least one exterior heat exchange fin extending from an exterior surface of the heat exchanger; and the at least one exterior heat exchange fin extends into the fuel reservoir.

In some embodiments, the fuel vapor separator further includes a fuel reservoir inlet fluidly communicating with the fuel reservoir; and when the fuel vapor separator is installed in an engine assembly: the fuel reservoir inlet is fluidly connected to a fuel tank; the inlet of the at least one fuel channel is fluidly connected to at least one fuel injector of the engine; hot fuel coming from the at least one fuel injector of the engine passes through the heat exchanger before entering the fuel reservoir; and fuel from the fuel tank enters into the fuel reservoir without passing through the heat exchanger.

In some embodiments, the fuel vapor separator further includes a fuel pump disposed at least partially in the fuel reservoir for supplying fuel from the fuel reservoir to the at least one fuel injector of the engine.

According to another aspect of the present technology, there is provided a heat exchanger for a fuel vapor separator, the heat exchanger including a heat exchanger body; a first fuel channel defined by the heat exchanger body, the first fuel channel including an inlet adapted for receiving fuel from an engine connected to the fuel vapor separator; a second fuel channel defined by the heat exchanger body, the second fuel channel including an outlet adapted for fluidly communicating with a fuel reservoir of the fuel vapor separator, an outlet of the first fuel channel being fluidly connected to an inlet of the second fuel channel; and at least one coolant channel defined by the heat exchanger body, the first fuel channel, the second fuel channel, and the at least one coolant channel being in thermal communication, the first fuel channel, the second fuel channel and the at least one coolant channel being parallel.

In some embodiments, the heat exchanger body is thermally conductive between at least the at least one fuel channel and the at least one coolant channel.

In some embodiments, the first and second fuel channels and the at least one coolant channel extend through a height of the heat exchanger body.

In some embodiments, the heat exchanger further includes a connector fluidly connecting an outlet of the first fuel channel to an inlet of the second fuel channel, the connector being connected to the heat exchanger body.

In some embodiments, the heat exchanger further includes at least one exterior heat exchange fin extending from an exterior surface of the heat exchanger body, the at least one exterior heat exchange fin extending into the fuel reservoir when the heat exchanger is installed in the fuel vapor separator.

In some embodiments, the heat exchanger body includes at least one inner heat exchange fin extending into the at least one coolant channel.

In some embodiments, the heat exchanger body is generally shaped like an elliptic cylinder.

In some embodiments, the first and second fuel channels and the at least one coolant channel extend through a height of the elliptic cylinder-shaped heat exchanger body.

In some embodiments, the heat exchanger body is formed by extrusion.

According to another aspect of the present technology, there is provided a marine outboard engine including an internal combustion engine including at least one fuel injector; a fuel vapor separator including: a separator body, a fuel reservoir defined at least partially by the separator body, and a first fuel pump fluidly connected between the fuel reservoir and the at least one fuel injector; a fuel tank for supplying fuel to the internal combustion engine; and a second fuel pump fluidly connected between the fuel tank and the fuel vapor separator. The fuel vapor separator further includes a heat exchanger disposed at least partially in the separator body, the heat exchanger including a heat exchanger body; at least one fuel channel defined by the heat exchanger body, the at least one fuel channel including: an inlet adapted for receiving fuel from the engine, and an outlet fluidly communicating with the fuel reservoir; and at least one coolant channel defined by the heat exchanger body, the at least one fuel channel and the at least one coolant channel being in thermal communication.

In some embodiments, the second fuel pump pumps fuel from the fuel tank to fuel reservoir of the fuel vapor separator; the first fuel pump pumps fuel from the fuel reservoir to the at least one fuel injector; fuel returning from the at least one fuel injector flows to the fuel reservoir through the at least one fuel channel of the heat exchanger; and coolant flows through the at least one coolant channel such that fuel flowing through the at least one fuel channel is cooled by the heat exchanger before returning to the fuel reservoir.

For purposes of this application, terms related to spatial orientation such as forward, rearward, upward, downward, left, and right, should be understood in a frame of reference of the fuel vapor separator. Terms related to spatial orientation when describing or referring to components or sub-assemblies of the fuel vapor separator separately therefrom should be understood as they would be understood when these components or sub-assemblies are mounted in the fuel vapor separator, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in a marine outboard engine that is used to propel a watercraft. It is contemplated that the present technology could have other uses, including a use in other small engine applications.

Figure 1:
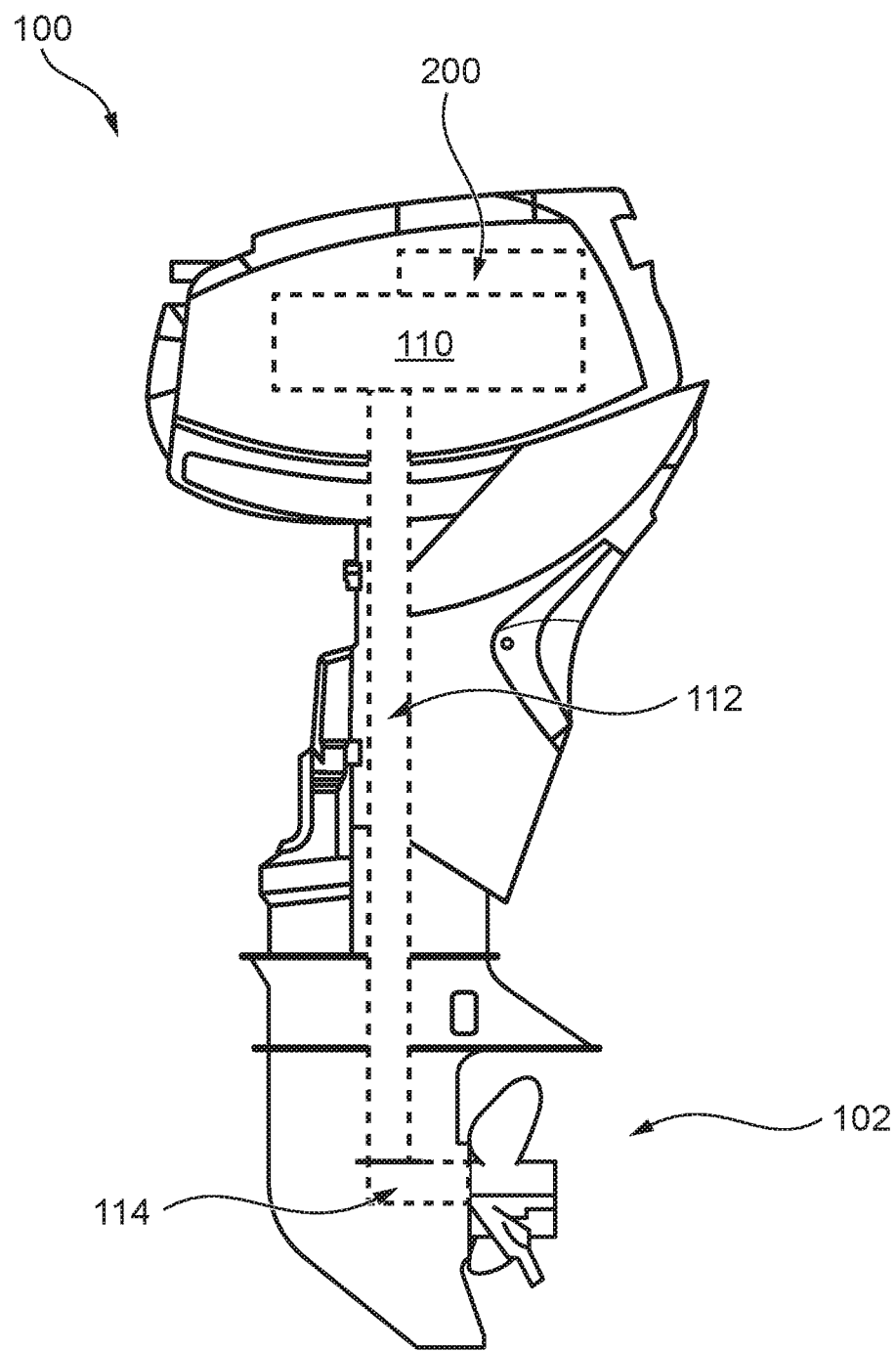
FIG. 1 is a left side elevation view of a marine outboard engine assembly.
Figure 2:
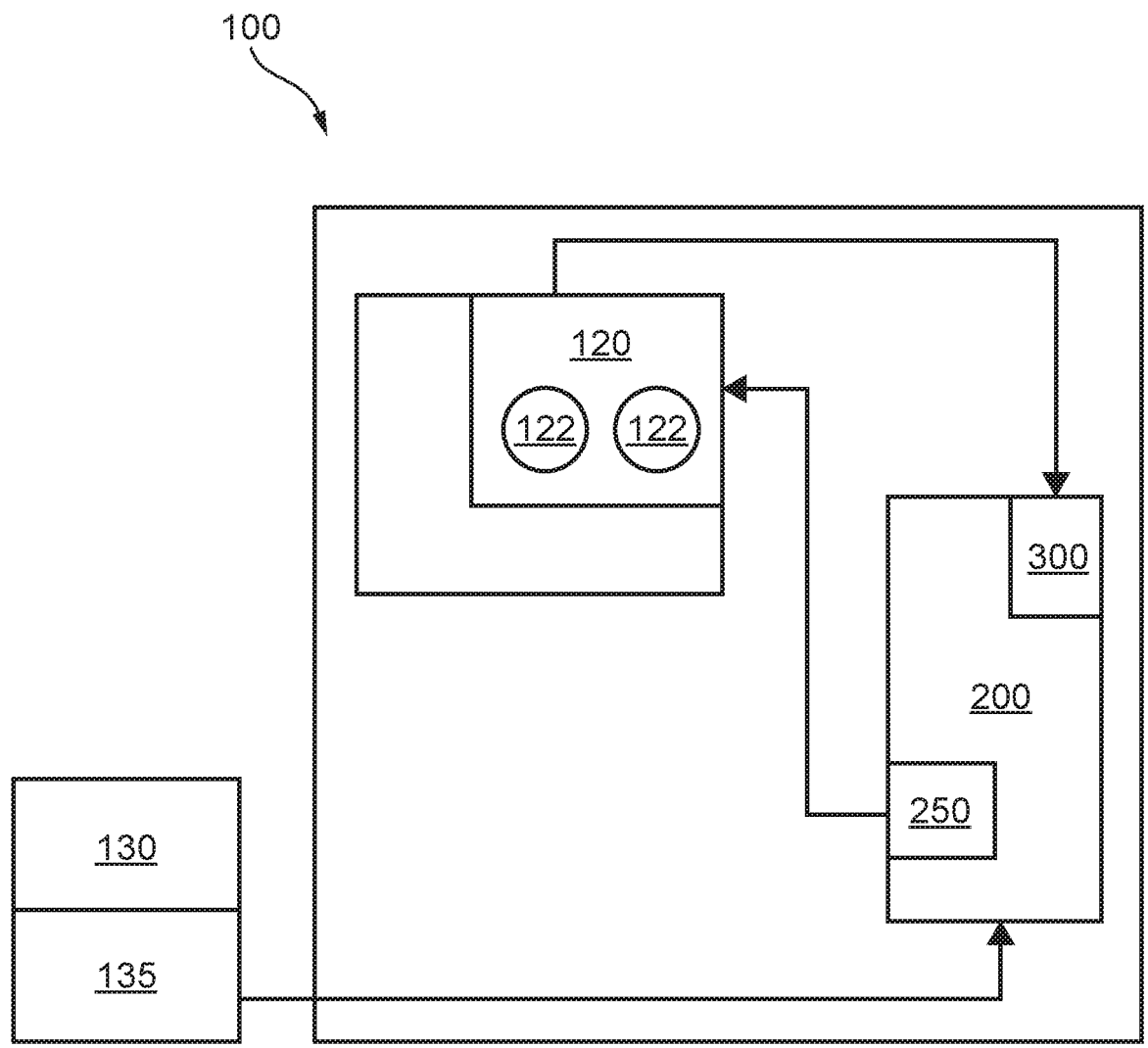
FIG. 2 is a schematic illustration of portions of the marine outboard engine assembly of FIG. 1.
Figure 3:
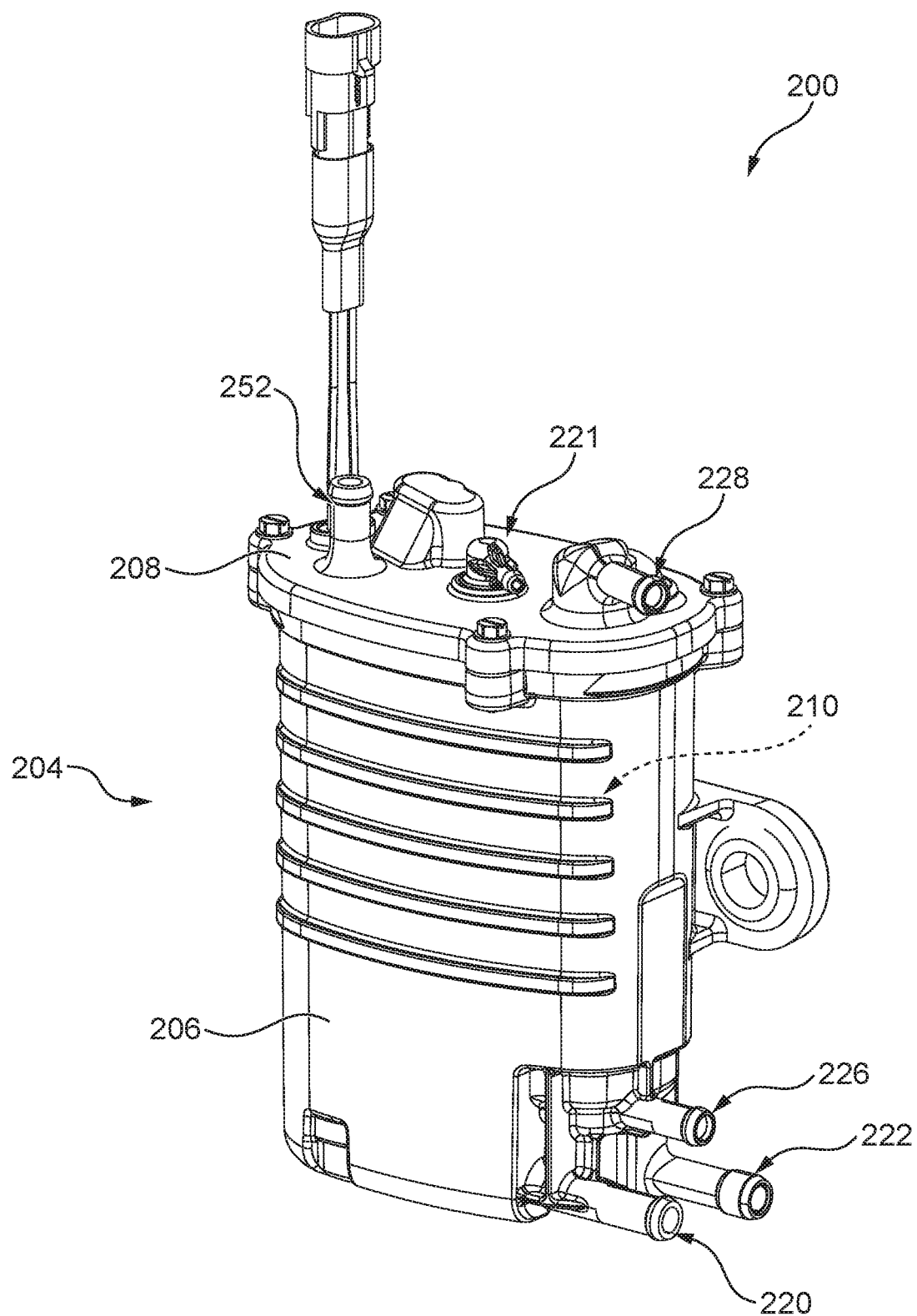
FIG. 3 is a top, front, left side perspective view of a fuel separator of the marine outboard engine assembly of FIG. 1.
Figure 4:
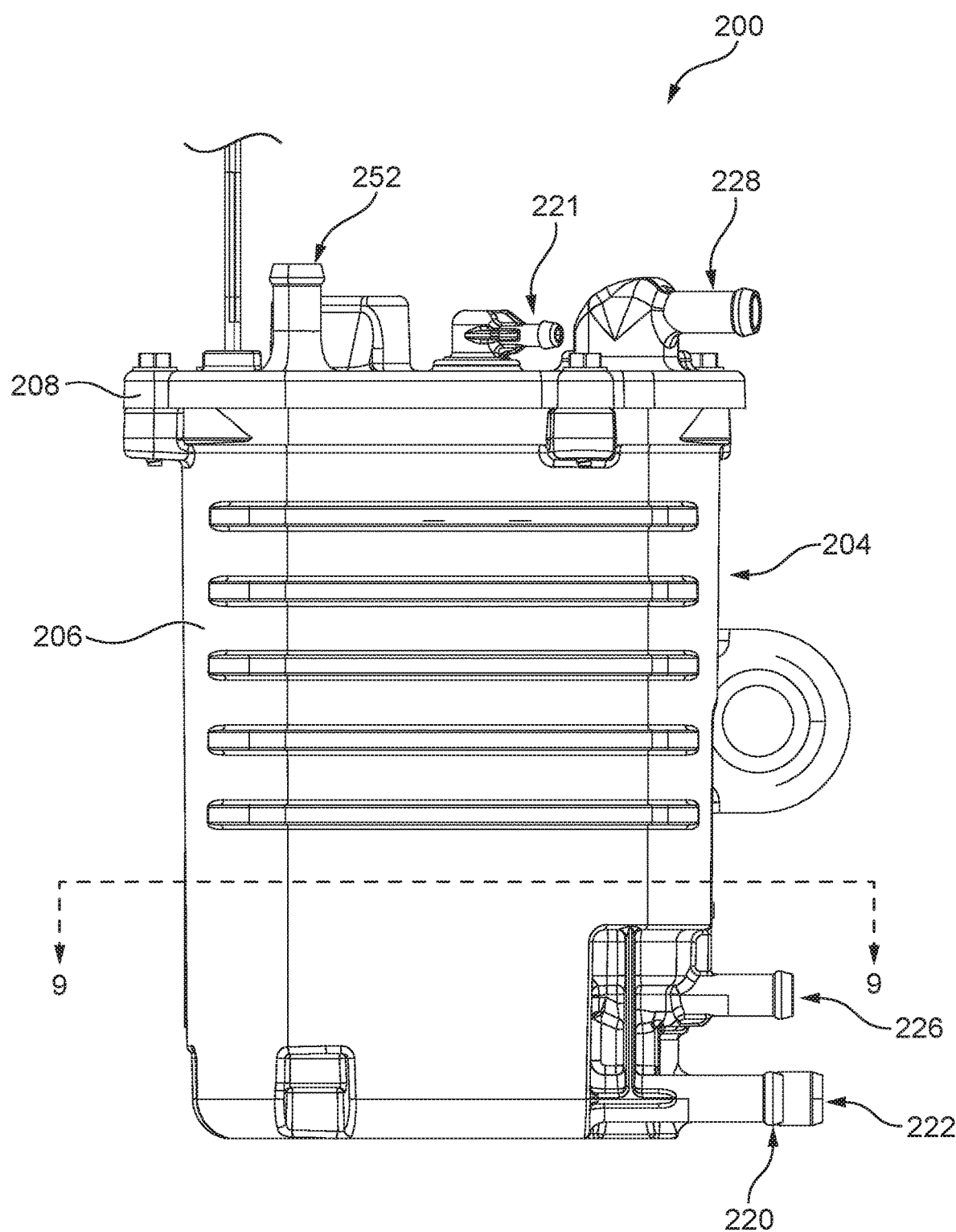
FIG. 4 is a front elevation view of the fuel vapor separator of FIG. 3.
Figure 5:
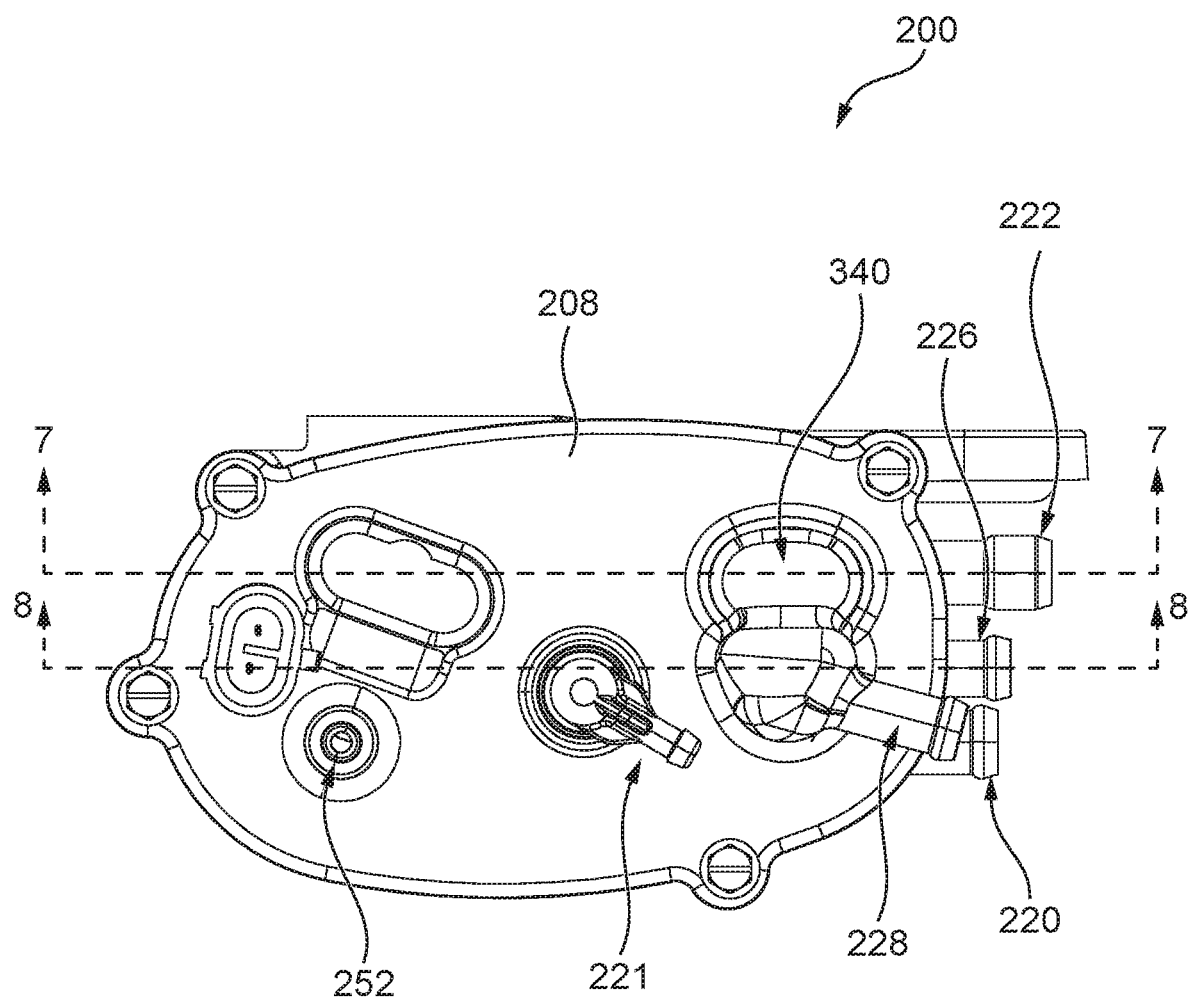
FIG. 5 is a top plan view of the fuel vapor separator of FIG. 3.
Figure 6:
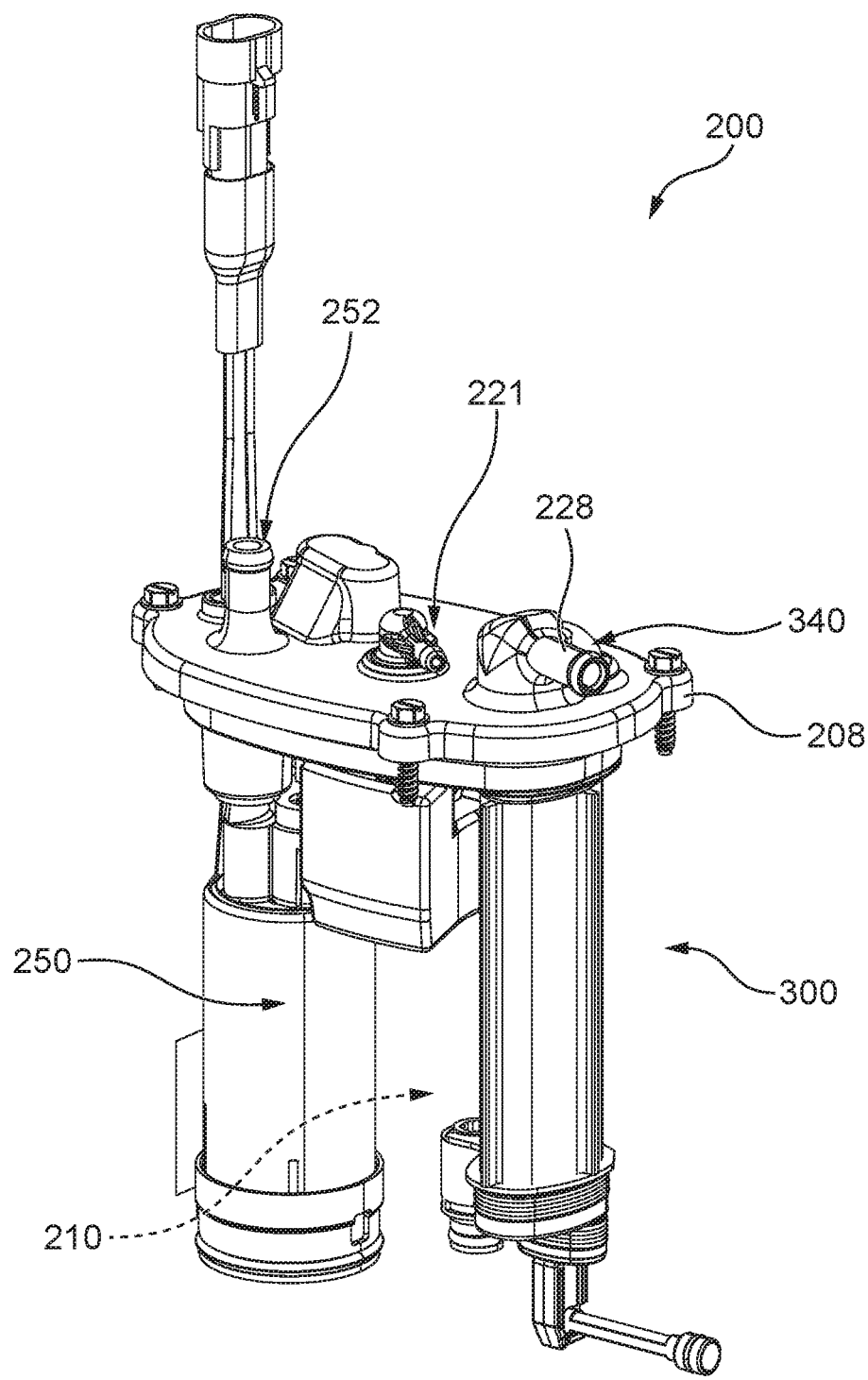
FIG. 6 is a top, front, left side perspective view of the fuel vapor separator of FIG. 3, with a separator body of the fuel vapor separator having been removed.
Figure 7:
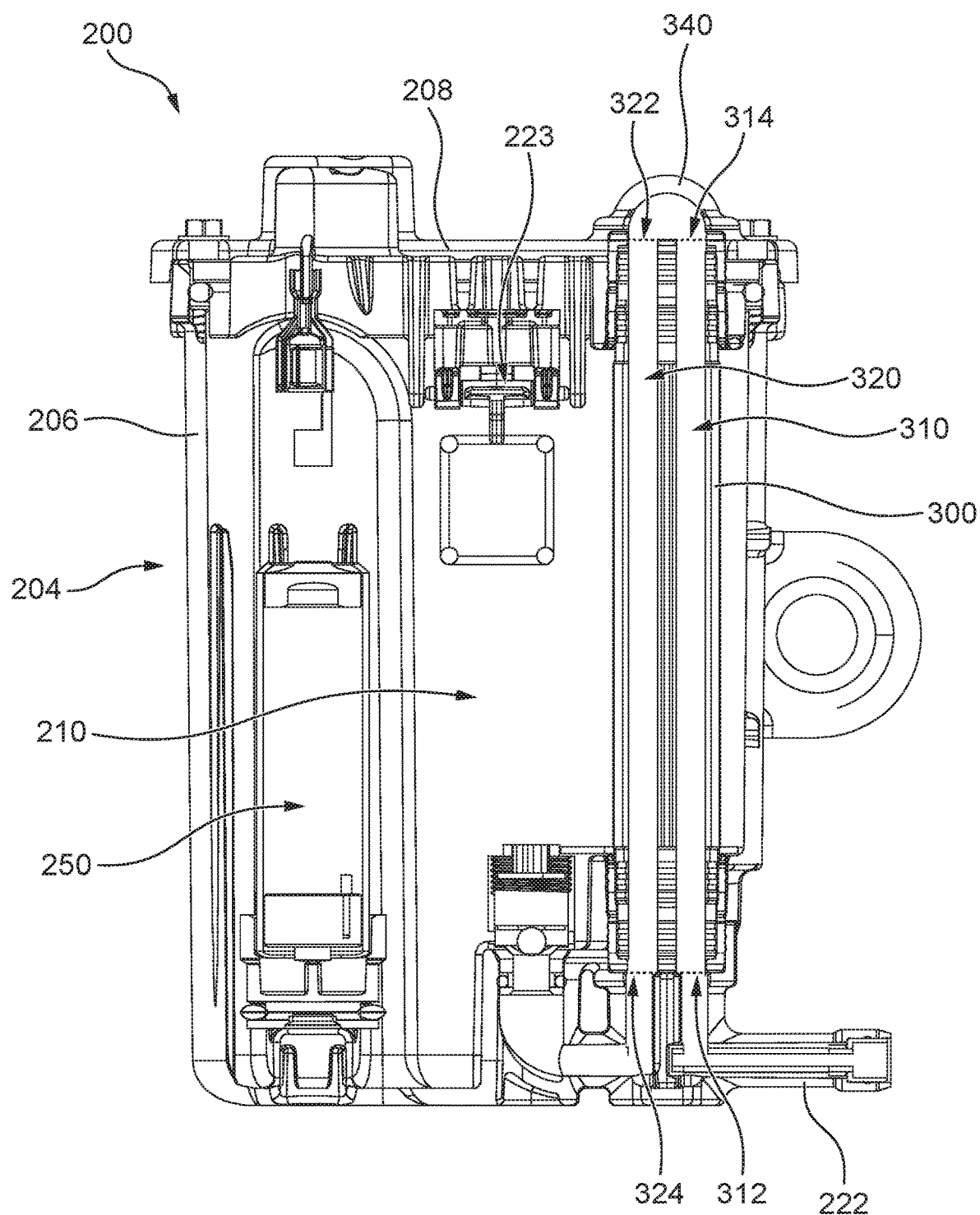
FIG. 7 is a cross-sectional view of the fuel vapor separator of FIG. 3, taken along line 7-7 of FIG. 5.

In reference to FIGS. 1 and 2, a marine outboard engine assembly 100 is illustrated (in isolation from the watercraft), also referred to herein as an outboard assembly 100. The outboard assembly 100 is adapted to pivotably and rotatably connect to the watercraft for providing propulsion. The outboard assembly 100 can be steered, tilted, and trimmed with respect to the watercraft in order to control movement of the watercraft.

The outboard assembly 100 includes an internal combustion engine 110 for powering the outboard assembly 100. The engine 110 is operatively connected to a driveshaft 112, shown schematically, for transferring power from the engine 110. A bottom portion of the driveshaft 112 is operatively connected to a propeller shaft 114 arranged perpendicular to the driveshaft 112. A propeller 102 is disposed on the propeller shaft 114 for operatively connecting to the engine 110 via the driveshaft 112. Power from the engine 110 thus creates propulsion of the watercraft via the propeller 102.

In the present embodiment, the internal combustion engine 110 is a two-stroke, gasoline-powered, direct injected internal combustion engine 110. It is contemplated that the internal combustion engine 110 could be a four-stroke direct injected internal combustion engine. It is contemplated that the internal combustion engine 110 could use a fuel other than gasoline, such as diesel.

As is illustrated schematically in FIG. 2, the engine 110 includes a hot rail 120 which has two fuel injectors 122 for injecting fuel into the engine 110. The outboard assembly 100 is fluidly connected to a fuel tank 130 disposed in the watercraft. The fuel tank 130 stores fuel for supplying the engine 110. The fuel tank 130 includes an opening and corresponding cap (not shown) for selectively receiving fuel therein. The outboard assembly 100 also includes a fuel pump 135 fluidly connected to the fuel tank 130. The fuel pump 135 is fluidly connected to the fuel tank 130, but it is contemplated that the pump 135 could be disposed inside of or partially within the fuel tank 130.

The outboard assembly 100 also includes a fuel vapor separator 200 for, inter alia, deaerating fuel to be delivered to the fuel injectors 122. The fuel vapor separator 200 is fluidly connected between the fuel pump 135 and the engine 110.

In the present non-limiting embodiment, about 30% to 60% of the fuel supply to the fuel injectors 122 is consumed by the engine 110 when operating at maximum throttle (also referred to as "wide open throttle"), while the remaining 70% to 40% is recirculated back to the fuel vapor separator 200. At minimum throttle (also referred to as "idle"), about 1% of the fuel supply to the injectors 122 is consumed and 99% is recirculated back to the fuel vapor separator 200. It is contemplated the proportion between the rate of fuel consumption and the rate of fuel recirculation could be different depending on, for example, each particular embodiment of the engine 110 and each particular embodiment of the fuel injector 122.

Fuel aids in cooling the fuel injectors 122 by flowing over the fuel injectors 122 in the hot rail 120. Whether in wide open throttle or in idle, the fuel recirculating back to the fuel vapor separator 200 is hotter than the fuel entering the fuel vapor separator 200 from the fuel tank 130. As hotter fuel both creates more vapor and becomes more difficult to pump, fuel returning to the fuel vapor separator 200 from the hot rail 120 is cooled. The fuel vapor separator 200 includes a heat exchanger 300 to aid in cooling the returning fuel, as will be described in more detail below.

With reference to FIGS. 3 to 9, the fuel vapor separator 200 will now be described in more detail. The fuel vapor separator 200 includes a separator body 204 which surrounds and/or defines different elements of the fuel vapor separator 200. The separator body 204 defines a fuel reservoir 210 inside the separator body 204. The fuel reservoir 210 is a space within the separator body 204 for receiving and storing fuel. As will be described in more detail below, the fuel reservoir 210 receives fuel from the fuel tank 130 prior to being pumped to the fuel injectors 122, as well as fuel returning from the fuel injectors 122. In the present embodiment, the fuel reservoir 210 is generally all the open space within the separator body 204, although it is contemplated that the fuel reservoir 210 could be defined by additional walls or structures within the separator body 204.

Although the entire open space within the separator body 204 is referred to as the fuel reservoir 210, it should be noted that the reservoir 210 is only partially filled at any given time in order to allow space above the fuel top surface for fuel vapor to escape the liquid fuel and separate.

The separator body 204 includes a body portion 206 and a cover 208 fastened to the body portion 206. It is contemplated that the separator body 204 could be differently arranged. For example, the cover 208 could be pivotally connected to the body portion 206 in some embodiments. It is also contemplated that the cover 208 could be glued or welded to the body portion 206. It is further contemplated that the separator body 204 could be formed from two or more portions fastened or fixed together. As one non-limiting example, the separator body 204 could be formed from two halves fastened together along a vertically extending seam.

The body portion 206 and the cover 208 of the separator body 204 are made from re-enforced plastic. It is contemplated that either or both of the body portion 206 and the cover 208 could be made from a different material, including but not limited to: die-cast aluminum and extruded aluminum. It is contemplated that the body portion 206 could be made from a different material than the cover 208. It is also contemplated that either or both of the body portion 206 and the cover 208 could be made from more than one material.

The separator body 204 includes a connection nipple 220 for connecting a fuel line (not shown) from the pump 135 of the fuel tank 130 to the fuel vapor separator 200. The connection nipple 220 is integrally formed with the body portion 206, but it is contemplated that the connection nipple 220 could be separate element fastened, welded, or otherwise connected to the body portion 206. The connection nipple 220 defines a passage which allows fuel pumped from the fuel tank 130 by the pump 135 to flow in through the connection nipple 220 and into the fuel reservoir 210.

The separator body 204, specifically on the cover 208, also includes a vapor release connection nipple 221 for allowing fuel vapor and other gases to escape the fuel vapor separator 200. A gas line (not shown) is connected to the connection nipple 221 when installed in the outboard assembly 100, an other end of the gas line being fluidly connected to an air intake system (not shown) of the engine 100 for combustion. The vapor separator 200 includes a vent valve 223 (see FIG. 7) actuated by a float which allows gas to pass through the valve 223 and the connection nipple 221 when the fuel level inside the fuel vapor separator 200 reaches a threshold value. The separator body 204 includes additional connection nipples for connecting fuel and coolant lines to the fuel vapor separator 200, as will be described in more detail below.

The fuel separator 200 includes a fuel pump 250 for pumping fuel from the fuel reservoir 210 to the engine 110. In the present embodiment, the pump 250 is disposed within the fuel separator body 204 in contact with and partially defining the fuel reservoir 210. It is contemplated that the pump 250 could be arranged outside of but fluidly connected to the separator body 204.

The fuel separator 200 also includes a heat exchanger 300 for cooling fuel returning to the fuel vapor separator 200 from the engine 110. The heat exchanger 300 is fluidly connected between the hot rail 120 of the engine 110 and the fuel reservoir 210. The heat exchanger 300 will be described in more detail below.

The heat exchanger 300 and the fuel pump 250 are disposed generally on opposite sides of the fuel reservoir 210. The fuel reservoir 210 partially extends around the heat exchanger 300 and the fuel pump 250, such that the fuel in the fuel reservoir 210 can flow around the heat exchanger 300 and the fuel pump 250. It is contemplated that, depending on the form of the separator body 204, the fuel pump 250, and/or the heat exchanger 300, the fuel reservoir 210 could be limited to a smaller space than in the current embodiment.

With additional reference to FIGS. 10 and 11, the heat exchanger 300 will now be described in more detail.

The heat exchanger 300 has a heat exchanger body 302. The heat exchanger body 302 is made up of a central portion 304, a top portion 306, and a bottom portion 308. The heat exchanger body 302 is made from thermally-conductive material, specifically extruded aluminum alloy. It is contemplated, however, that the body 302 could be made from a variety of thermally-conductive materials, including but not limited to: steel (carbon), steel (stainless), copper, bronze, brass, titanium, various alloys, carbon steel, thermally conductive plastics, and stainless steel. It is also contemplated that the heat exchanger body 302 could be made from two or materials, depending on the embodiment.

The heat exchanger body 302 is generally shaped like an elliptic cylinder. It is contemplated that the heat exchanger body 302 could have a different cross-sectional form, including but not limited to: circular or numerous polygonal shapes. The heat exchanger body 302 of the present embodiment is fabricated by extrusion, where each portion 304, 306, 308 of the body 302 is extruded along the vertical axis of the heat exchanger 300 as installed. The portions 304, 306, 308 are then machined from the extruded heat exchanger 300. It is contemplated that other fabrications methods could be used for one, some, or all of the portions 304, 306, 308, depending on the specific embodiment.

The heat exchanger body 302 defines two fuel channels 310 and 320. The fuel channels 310, 320 have circular cross-sections, although different channel cross-sectional shapes are contemplated. The channels 310, 320 extend vertically through the height of the heat exchanger body 302 and are parallel to each other. Depending on the embodiment, it is contemplated that the channels 310, 320 could be differently arranged, including not being parallel. As is illustrated in the embodiment described with reference to FIGS. 13 and 14, the heat exchanger 300 could include only one fuel channel in some cases. It is also contemplated that the heat exchanger 300 could include more than two fuel channels 310, 320.

The channels 310, 320 are open at their top and bottom ends. The channel 310 has an inlet 312 on the bottom side of the heat exchanger body 302 in the bottom portion 308, and an outlet 314 on the top side of the heat exchanger body 302 in the top portion 306. The channel 320 has an inlet 322 on the top side of the heat exchanger body 302 in the top portion 306, and an outlet 324 on the bottom side of the heat exchanger body 302 in the bottom portion 308. In the present embodiment, there are no structural differences between the inlets 312, 324 and the outlets 314, 322 of the channels 310, 320; the nomenclature of the inlet and outlet refers simply to the direction of fuel flowing either into or out of the channels 310, 320. Fuel passing through the heat exchanger 300 enters through the inlet 312 of the channel 310, passes through the outlet 314, through a connector 340 (described further below), into the inlet 322 of the channel 320, and out of the outlet 324. The outlet 324 is in fluid communication with the fuel reservoir 210. The flow of fuel through the heat exchanger 300 and the fuel vapor separator 200 will be described in more detail below.

As is mentioned above, the vapor separator 200 includes the connector 340 which fluidly connects the outlet 314 of the channel 310 to the inlet 322 of the channel 320. The connector 340 is a generally rounded portion of the cover 208, but other forms are contemplated. As can be seen in at least FIG. 7, the connector 340 is disposed on a top side of the fuel vapor separator 200 and fluidly connects to the channels 310, 320. It is contemplated that the connector 340 could be disposed fully inside the fuel vapor separator body 204 in some embodiments. It is also contemplated that the connector 340 could be formed separately from the fuel vapor separator body 204 and/or the cover 208, for example in the form of a U-shaped pipe. It is further contemplated that the connector 340 could be formed integrally with the heat exchanger body 302.

Figure 12:
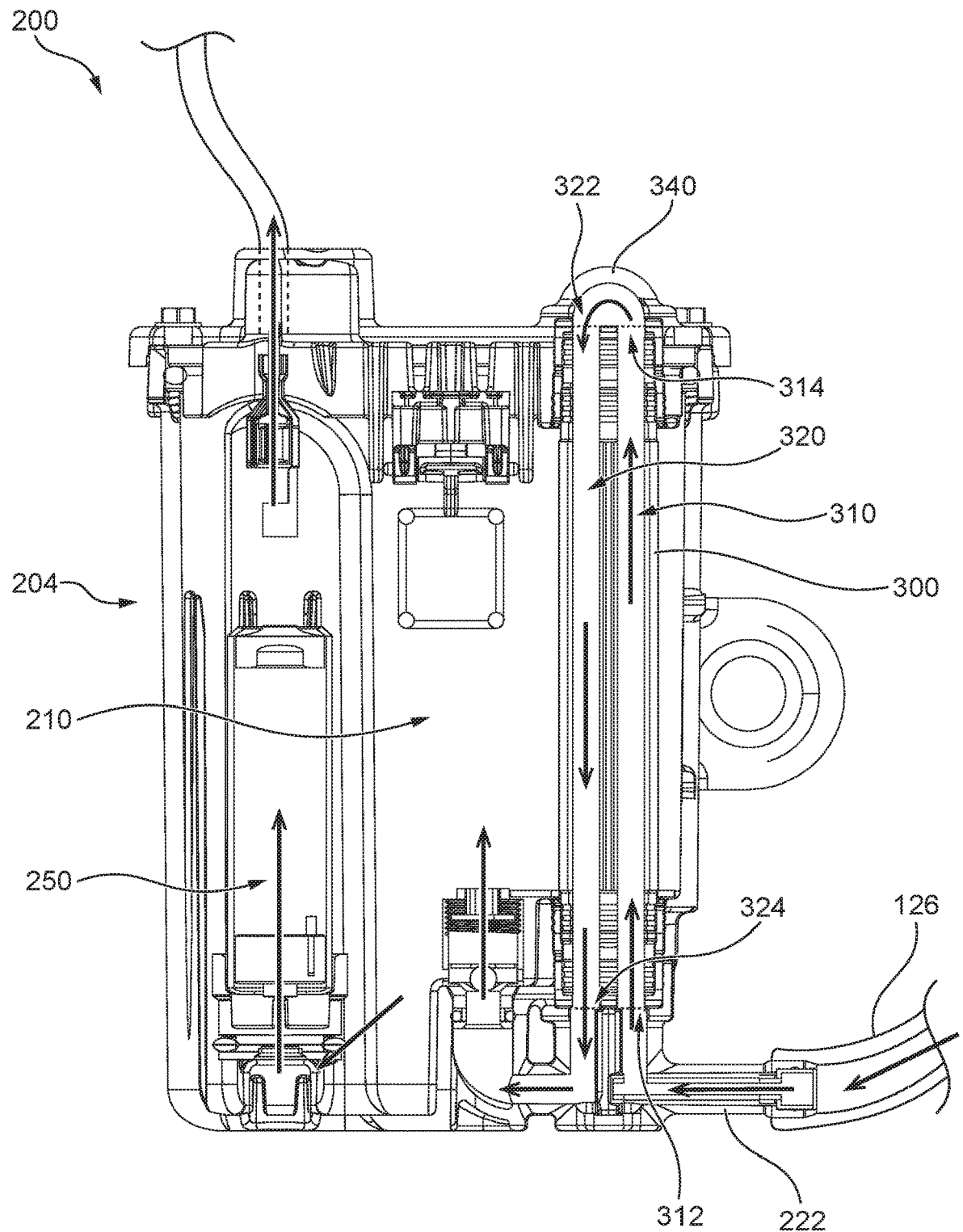
FIG. 12 is the cross-sectional view of FIG. 7, with a fuel flow path illustrated.

The separator body 204 includes a connection nipple 222 for connecting a fuel line for delivering fuel from the hot rail 120 to the fuel vapor separator 200. As best seen in FIG. 12, the connection nipple 222 defines a passage in fluid communication with the inlet 312 of the fuel channel 310 when the heat exchanger 300 is installed in the fuel vapor separator 200.

The heat exchanger body 302 also defines a coolant channel 330 for receiving a coolant fluid as a heat sink in the heat exchanger 300. While the coolant fluid for the present embodiment is water, it is contemplated that a variety of coolant fluids could be used.

The coolant channel 330 extends vertically through the heat exchanger body 302 and is parallel to the fuel channels 310, 320. It is contemplated that the coolant channel 330 could be differently arranged, including for example not being parallel to the fuel channels 310, 320. In some embodiments, it is contemplated that the heat exchanger 300 could include more than one coolant channel 330.

Figure 8:
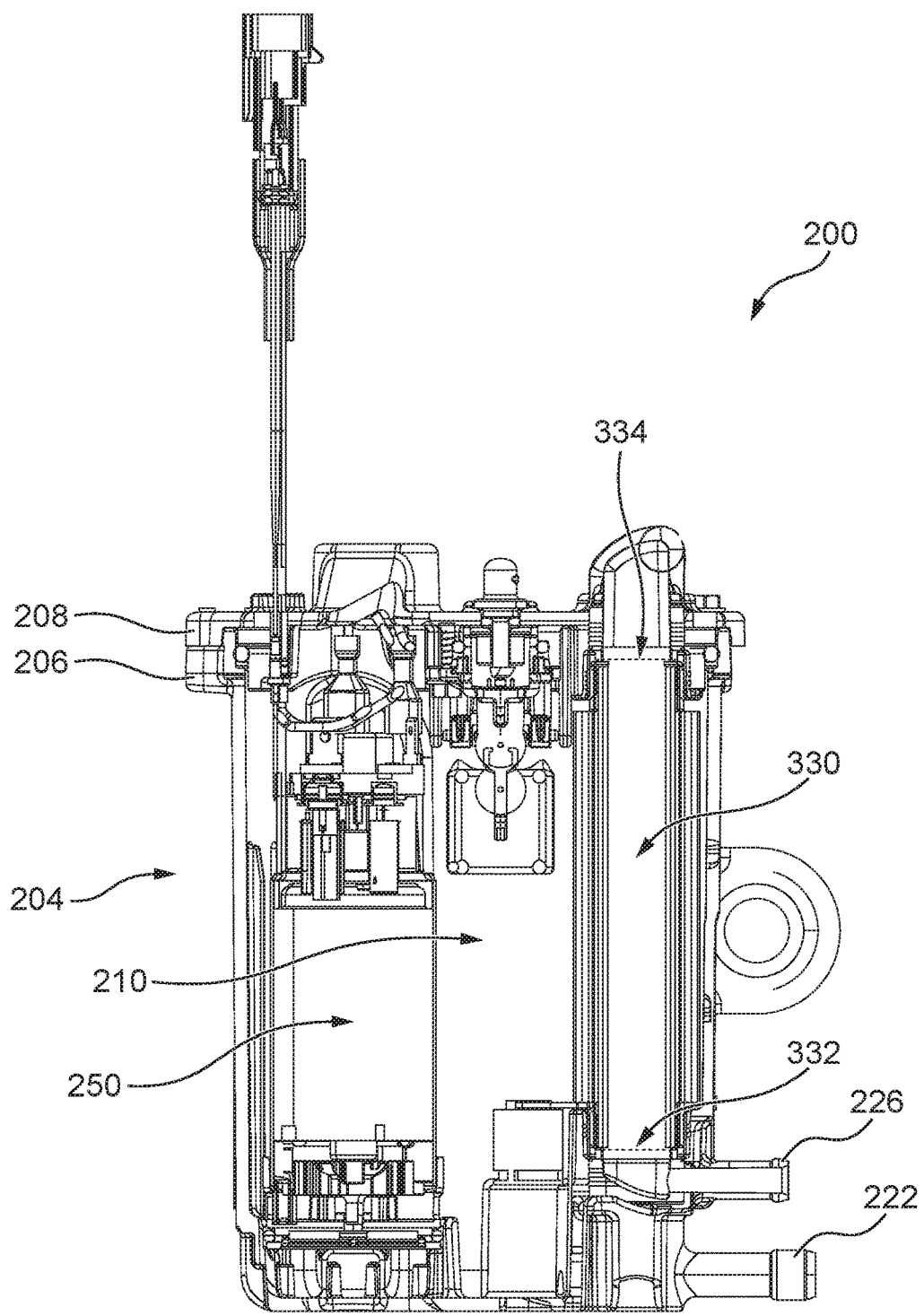
FIG. 8 is a cross-sectional view of the fuel vapor separator of FIG. 3, taken along line 8-8 of FIG. 5.
Figure 9:
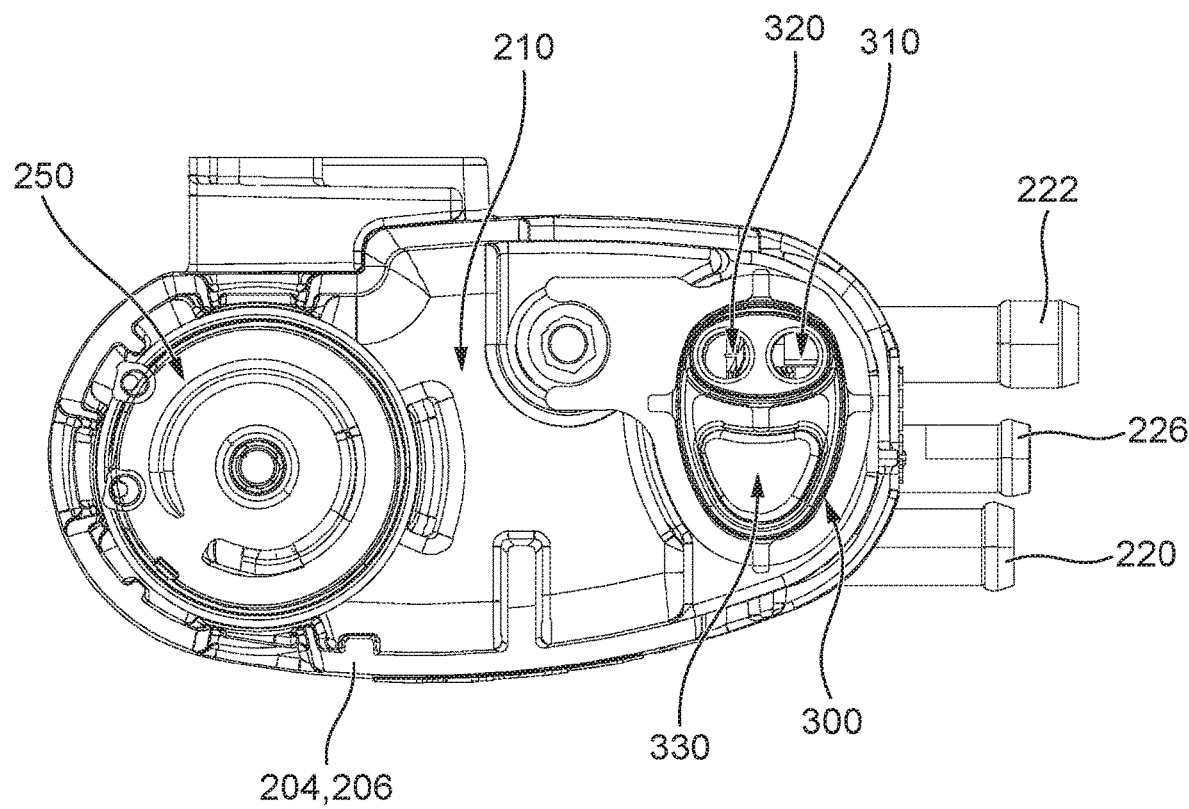
FIG. 9 is a cross-sectional view of the fuel vapor separator of FIG. 3, taken along line 9-9 of FIG. 4.
Figure 10:
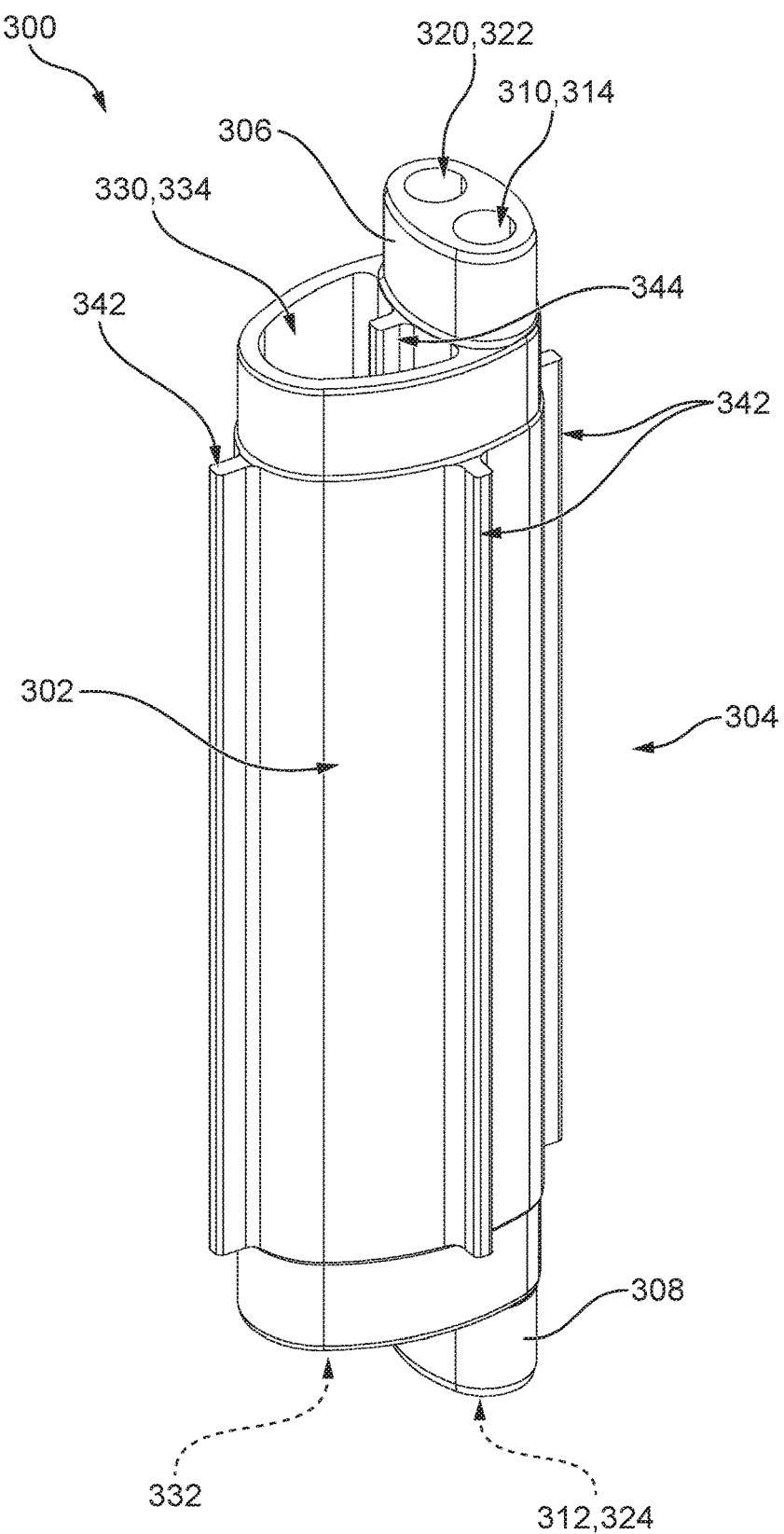
FIG. 10 is a top, front, and left side perspective view of a heat exchanger of the fuel vapor separator of FIG. 3.
Figure 11:
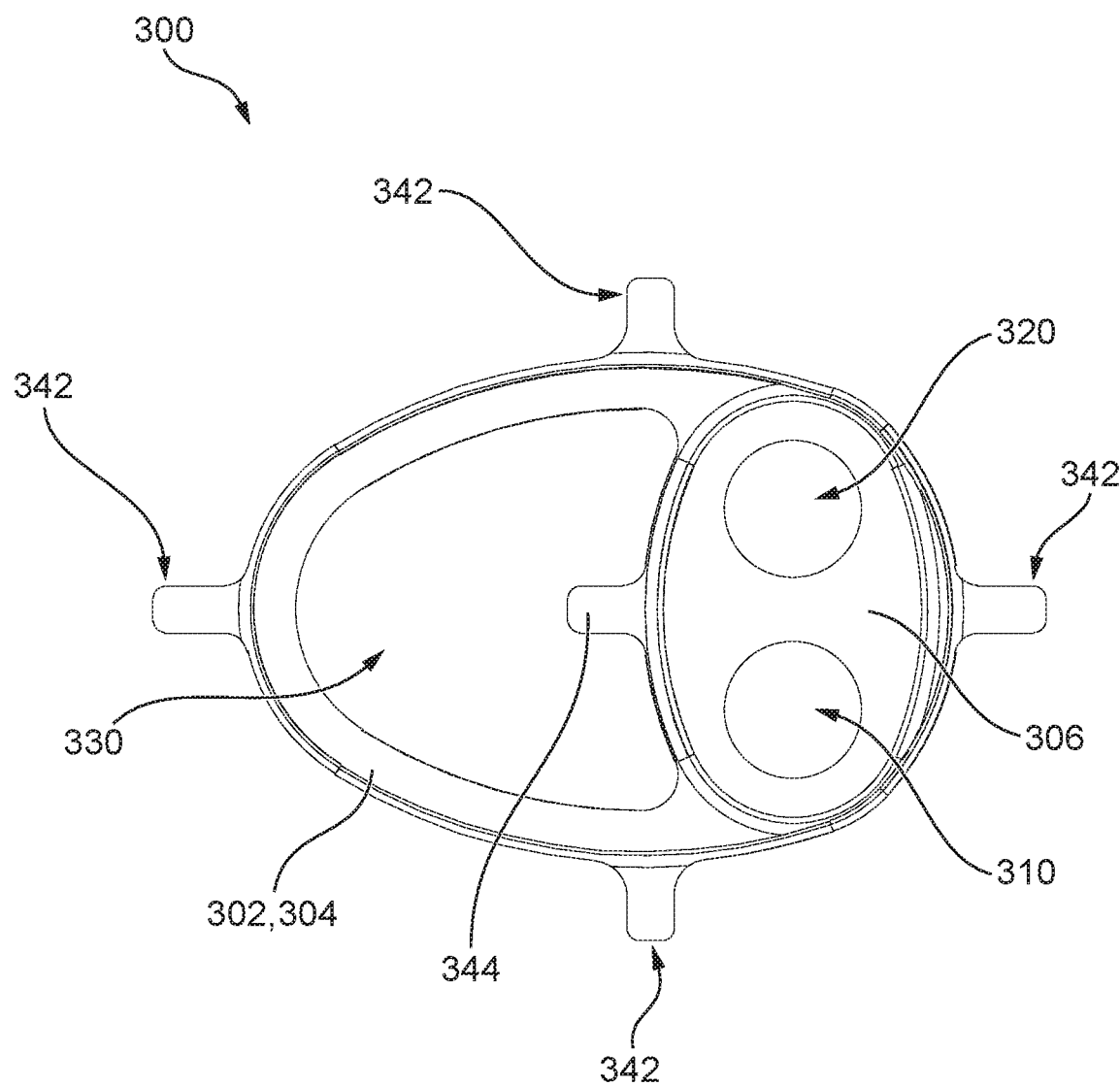
FIG. 11 is a top elevation view of the heat exchanger of FIG. 10.

As seen in FIGS. 8 and 10, the coolant channel 330 includes an inlet 332 defined on a bottom surface of the heat exchanger body 302, through which water (or any other coolant fluid) enters when the heat exchanger 300 is in use. The coolant channel 330 also includes an outlet 334 defined on a top surface of the heat exchanger body 302 through which the coolant fluid flows out from the channel 330. It is contemplated that the coolant channel 330 could flow in the opposite direction, such that the inlet 332 and the outlet 334 could be reversed.

The separator body 204 includes a connection nipple 226 for connecting a coolant line (not shown) for delivering coolant fluid to the fuel vapor separator 200. In the present embodiment, fuel cooling in the fuel vapor separator 200 is performed by an open-loop system which utilizes the body of water through which the watercraft is traveling. The coolant line is connected to a water pump in the outboard assembly 100 for pumping water surrounding the outboard assembly 100 into the coolant line. As can be seen in FIG. 8, the connection nipple 226 defines a passage fluidly communicating with the coolant inlet 332, when the heat exchanger 300 is installed in the fuel vapor separator 200. The separator body 204 also includes a connection nipple 228 for connecting another coolant lines for receiving water flowing out of the fuel vapor separator 200. Specifically the connection nipple 228 defines a passage in fluid communication with the coolant outlet 334. Water exiting the connection nipple 228 through the coolant line connected thereto is returned to the body of water surrounding the watercraft. In some embodiments, the water exiting the fuel vapor separator 200 could be delivered to one or more further components of the outboard assembly 100. For example, it is contemplated that water leaving the fuel vapor separator 200 could subsequently be delivered to an exhaust system of the outboard assembly 100 to also cool the exhaust system.

It is contemplated that in some embodiments of the fuel vapor separator 200 and/or the heat exchanger 300, the cooling system (including the coolant channel 330 and the corresponding nipples 226, 228 of the separator body) could be a closed-loop system. In such a system, the coolant channel 330 and the corresponding nipples 226, 228 would be fluidly connected by coolant lines to a coolant reservoir disposed in the outboard assembly 100 or in the watercraft. An additional heat exchanger in thermal contact with the body of water surrounding the watercraft would also be included to cool the coolant fluid once heated in the vapor separator 200. A coolant pump, fluidly connected between the coolant reservoir, the coolant channel 330, and the additional heat exchanger would further be included to circulate the coolant fluid. The coolant in a closed-loop system could be water as is described above, or could be any appropriate refrigerant or heat transfer fluid.

The cross-section of the coolant channel 330 is generally D-shaped, although the cross-section could be differently shaped depending on the specific embodiment. As can be seen in at least FIG. 9, the fuel channels 310, 320 are disposed next to a flat side of the D-shaped cross-section of the coolant channel 330. It is contemplated that the channels 310, 320, 330 could have different relative positions, including in some cases if one or more of the channels 310, 320, 330 have different cross-sectional shapes. As one non-limiting example, the fuel channels 310, 320 could be disposed on opposite sides of the coolant channel 330. It is also contemplated that the coolant channel 330 could extend at least partially around and/or between the fuel channels 310, 320.

The cross-sectional area of the coolant channel 330 is greater than the cross-sectional area of each of the fuel channels 310, 320. The cross-sectional area of the coolant channel 330 is also greater than the combined total cross-sectional areas of the fuel channels 310, 320. While the relative cross-sectional areas of the channels 310, 320, 330 could be different in different embodiments, the relative areas of the present embodiment aid in cooling the fuel flowing through the heat exchanger 300. The greater area of the coolant channel 330 allows for more water to flow through the coolant channel 330 than the total amount of fuel passing through both fuel channels 310, 320, such that heat transfer from the fuel to the water is not saturated before the water exits the heat exchanger 300.

The coolant channel 330 and the fuel channels 310, 320 are in thermal communication, via the heat exchanger body 302. In the present embodiment, channels 310 and 330 have parallel flow, where the fuel and water are flowing in the same direction. Channels 320 and 330 have cross-flow, where the fuel and water are flowing in opposite directions. When in use, heat flows from the fuel channels 310, 320, through the portion of the heat exchanger body 302 between the coolant channel 330 and the fuel channels 310, 320, and into the coolant passing through the coolant channel 330. As is mentioned above, the heat exchanger body 302 is made from a thermally-conductive metal, and is used in order to cool the fuel flowing through the heat exchanger 300 before entering the fuel reservoir 210.

The coolant channel 330 is also in thermal communication with the fuel reservoir 210 via the heat exchanger body 302, specifically an exterior surface thereof. The heat exchanger body 302 further includes four heat exchange fins 342 extending out from the exterior surface of the heat exchanger 300. Depending on the embodiment, the heat exchanger 300 could include more or fewer fins 342.

The heat exchange fins 342 extend out into the fuel reservoir 210 to aid in partially cooling or maintaining the temperature of the fuel in the fuel reservoir 210. The water (or other coolant) flowing through the coolant channel 330 is also at a lower temperature than the fuel in the fuel reservoir 210, so the exterior surface and the fins 342 also absorb heat from the fuel in the fuel reservoir 210.

The heat exchanger body 302 also includes a heat exchange fin 344 which extends into the coolant channel 330. In some embodiments, it is contemplated that there could be none or more fins 344 extending into the coolant channel 330. The heat exchange fin 344 aids in transferring heat from the fuel channels 310, 320 to the coolant channel 330.

With reference to FIG. 12, flow of fuel through the outboard assembly 100 will now be described in more detail. The general direction of fuel flow through the fuel vapor separator 200 is indicated by the arrows in FIG. 12.

Fuel from the fuel tank 130 is pumped by the pump 135 through the fuel line connected to the connection nipple 220. Through the connection nipple 220, the fuel enters the fuel reservoir 210 of the fuel vapor separator 200. The fuel enters into a bottom portion the fuel reservoir 210, below the top surface of the fuel already present in the fuel reservoir 210 in order to minimize creation of additional vapor through splashing. Vapor present in the fuel entering through the nipple 220 then rises through the fuel reservoir 210, and is released by the valve 223 out through the connection nipple 221, as mentioned above.

From the fuel reservoir 210, fuel is pumped by the pump 250 out through a fuel line connected to the connection nipple 252. Fuel is drawn from a bottom portion of the fuel reservoir 210 into the pump 250 to avoid drawing vapor back into the fuel. From the connection nipple 252, the fuel line conveys the fuel to the hot rail 120 of the engine 110. A portion of the fuel in the hot rail 120 is injected into the engine 110 by the fuel injectors 122 for combustion.

Fuel remaining after injection flows past the fuel injectors 122, absorbing heat therefrom for partially cooling the fuel injectors 122. A fuel line 126 (see FIG. 12) connected to the hot rail 120 at one end and connected to the connection nipple 222 at its other end returns the now-heated fuel from the engine 110 to the fuel vapor separator 200. From the connection nipple 222, the fuel flows into the vapor separator 200 via the heat exchanger 300. Specifically, the fuel flows through the fuel channel 310, through the connector 340, through the fuel channel 320, and out of the heat exchanger 300 into the fuel reservoir 210. The fuel re-entering the fuel reservoir 210 passes out of the heat exchanger 300 below the top surface of the fuel in the fuel reservoir 210, once again to avoid splashing and corresponding vapor creation. The fuel is cooled while passing through the channels 310, 320, where the water flowing through the coolant channel 330 absorbs heat from the fuel in the channels 310, 320. In this way, the hot fuel is cooled before entering the fuel reservoir 210.

Figure 13:
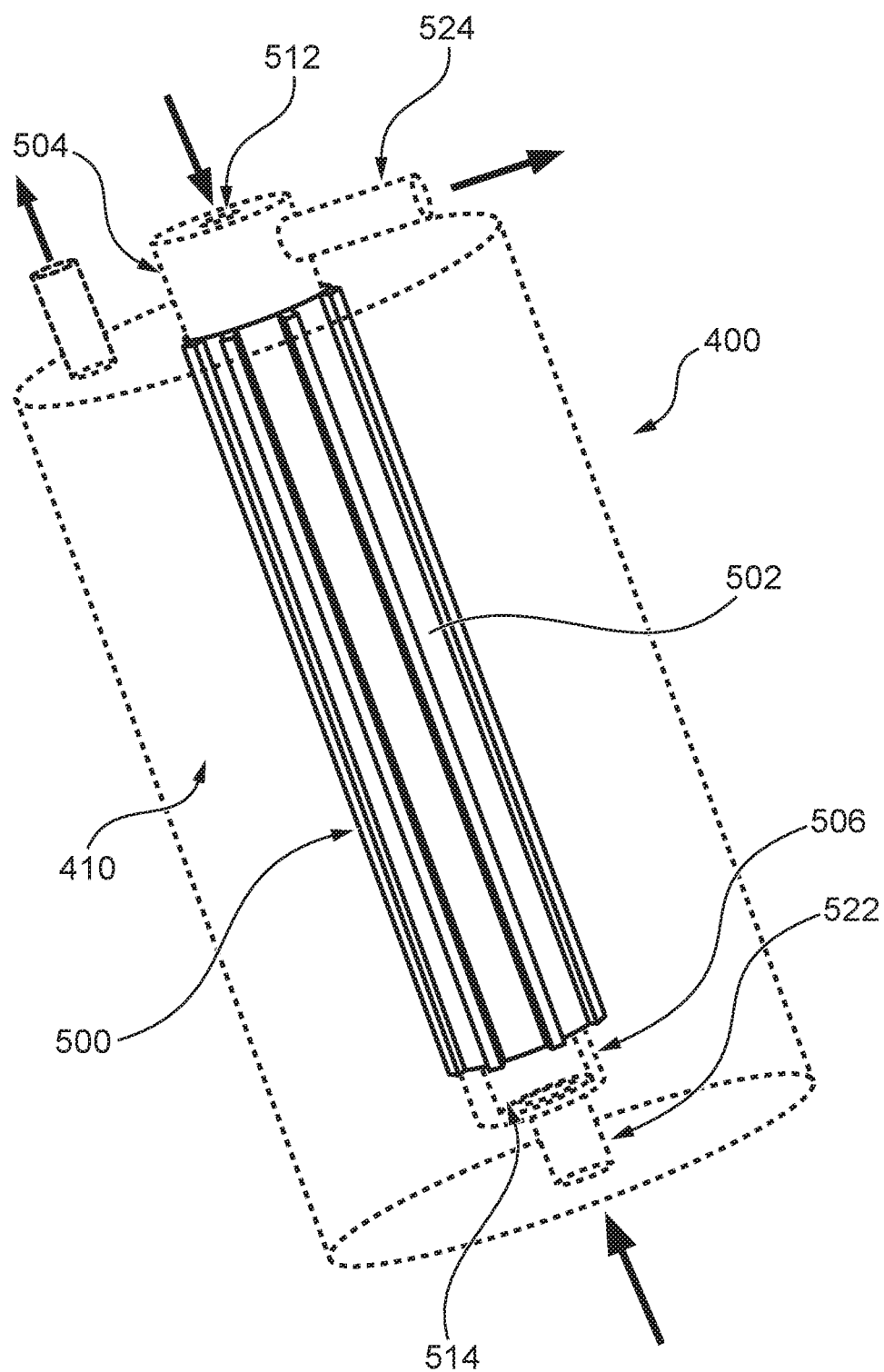
FIG. 13 is a schematic view of another embodiment of a fuel vapor separator according to the present technology.
Figure 14:
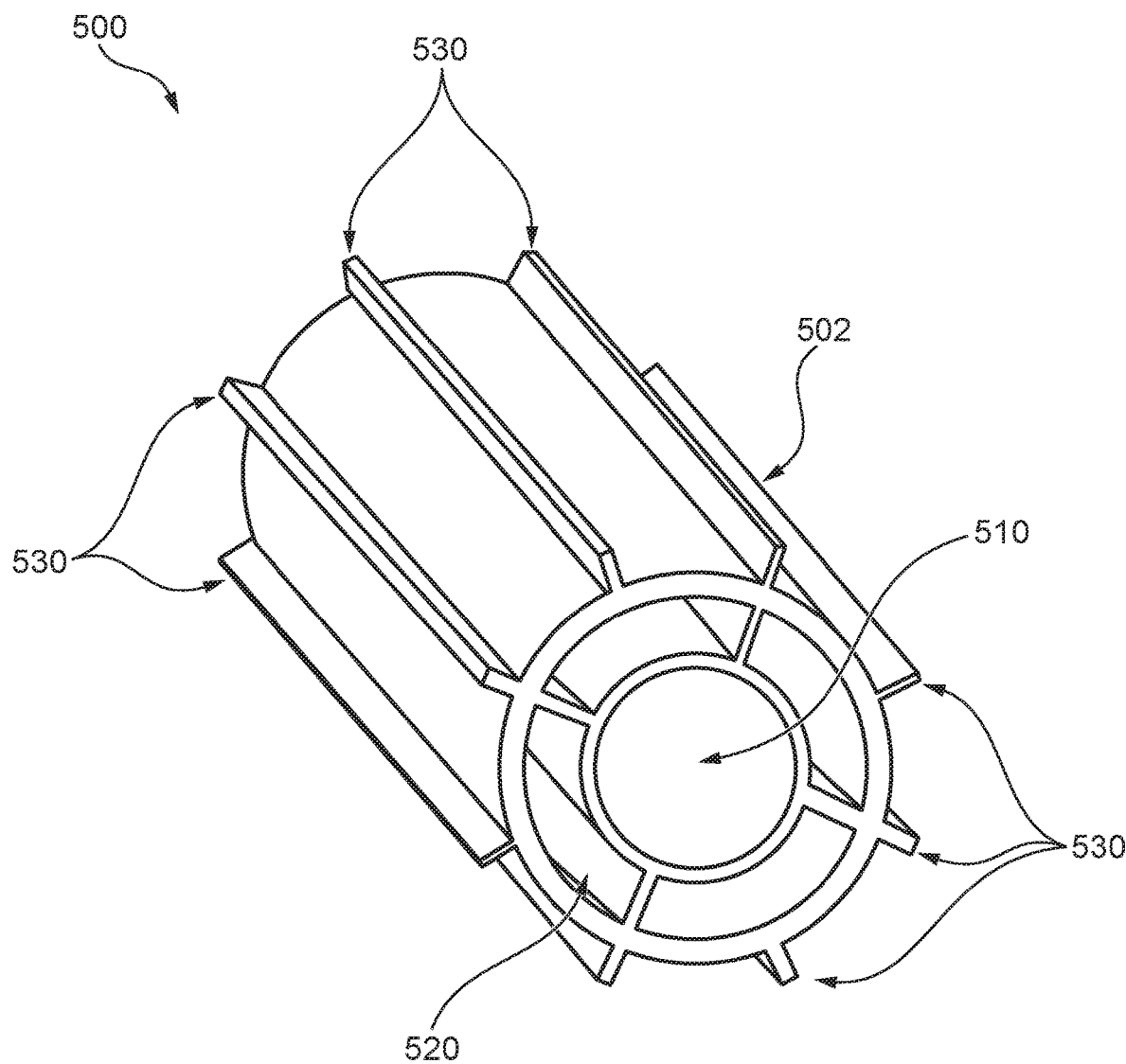
FIG. 14 is a perspective view of a heat exchanger of the fuel vapor separator of FIG. 13.

Another embodiment of a fuel vapor separator 400, with a corresponding other embodiment of a heat exchanger 500 is illustrated in FIGS. 13 and 14. The fuel vapor separator 400 includes generally the same components as the fuel vapor separator 200 described above which will not be described here again.

The heat exchanger 500 is disposed in a fuel reservoir 410 of the fuel vapor separator 400. The heat exchanger 500 includes a body portion 502, shown in isolation in FIG. 14.

Connected to the body portion 502 is a top connecting portion 504 and a bottom connecting portion 506, each being welded to the body portion 502. The body portion 502 is formed by extrusion, although alternative methods of fabrication are contemplated. It is also contemplated that the portions 504, 506 could be machined from the body portion 502.

The heat exchanger 500 has one central fuel channel 510 extending through a center of the body portion 502 through which hot fuel enters the fuel vapor separator 400. The fuel enters the fuel channel 510 through an inlet 512 in the top side of the heat exchanger 500. Fuel then passes through the fuel channel 510, and then out of the heat exchanger 510 and into the fuel reservoir through a fuel outlet 514 on the bottom side of the heat exchanger 500. As with the fuel vapor separator 200, the fuel re-enters the fuel vapor separator 400 in a bottom portion of the fuel reservoir 410 in order to limit splashing.

The heat exchanger 500 has four cooling channels 520 defined in the body portion 502 which surround the fuel channel 510. It is contemplated that the heat exchanger 500 could include more or fewer cooling channels 520. The bottom portion 506 defines a coolant inlet 522 through which water (or other coolant fluid) enters the heat exchanger 500 from a bottom side of the fuel vapor separator 400. The bottom portion 506 includes distribution channels (not shown) for dispersing the water from the single inlet 522 to the four coolant channels 520. The top portion 504 has similar channels for collecting water from the four coolant channels 520 into a single outlet 524. The outlet 524 is arranged perpendicularly to the inlet 522, but other arrangements are contemplated.

As the cooling water flows upward through the coolant channels 520, the water and the fuel flowing downward through the fuel channel 510 are in cross-flow. It is contemplated that the direction of flow of the water and/or the fuel could be reversed. It is also contemplated that the channels 510, 520 could be differently arranged. For example, in some embodiments there could be additional fuel channels 510.

The body portion 502 also includes eight exterior heat exchange fins 530 extending outward from an exterior surface. As the coolant channels 520 are disposed between the fuel channel 510 and the fuel reservoir 410, the cooling water absorbs heat from both. The body portion 502 has a generally circular cross-section, although different shapes could be employed. As can be seen in FIG. 14, the overall form of the body portion 502 resembles a ship's wheel, although a variety of forms are contemplated.

Modifications and improvements to the above-described embodiments of the present technology may become apparent to those skilled in the art. The foregoing description is intended to be exemplary rather than limiting.

What is claimed is:

1. A fuel vapor separator for connecting to an engine, the fuel vapor separator comprising:
    a separator body;
    a fuel reservoir defined at least partially by the separator body; and
    a heat exchanger disposed at least partially in the separator body, the heat exchanger comprising:
        a heat exchanger body;
        at least one fuel channel defined by the heat exchanger body, the at least one fuel channel including:
            an inlet adapted for receiving fuel from the engine, and an outlet fluidly communicating with the fuel reservoir; and
at least one coolant channel defined by the heat exchanger body,
the at least one fuel channel and the at least one coolant channel being in thermal communication.

2. The fuel vapor separator of claim 1, wherein the heat exchanger body is thermally conductive between at least the at least one fuel channel and the at least one coolant channel.

3. The fuel vapor separator of claim 1, wherein the at least one fuel channel and the at least one coolant channel are parallel.

4. The fuel vapor separator of claim 1, wherein:
the at least one fuel channel includes a first fuel channel and a second fuel channel;
the inlet of the at least one fuel channel is an inlet of the first fuel channel;
the outlet of the at least one fuel channel is an outlet of the second fuel channel; and
an outlet of the first fuel channel is fluidly connected to an inlet of the second fuel channel.

5. The fuel vapor separator of claim 4, wherein the first fuel channel and the second fuel channel are parallel.

6. The fuel vapor separator of claim 5, wherein:
the inlet of the first fuel channel and the outlet of the second fuel channel open in opposite directions; and
the first and second fuel channels are disposed between the inlet of the first fuel channel and the outlet of the second fuel channel.

7. The fuel vapor separator of claim 4, wherein the heat exchanger further comprises a connector connected to the heat exchanger body, the connector fluidly connecting the outlet of the first fuel channel to the inlet of the second fuel channel.

8. The fuel vapor separator of claim 4, wherein:
coolant flowing through the at least one coolant channel flows in an opposite direction than fuel flowing through the second fuel channel; and
coolant flowing through the at least one coolant channel flows in a same direction as fuel flowing through the first fuel channel.

9. The fuel vapor separator of claim 4, wherein:
a cross-section of the at least one coolant channel is generally D-shaped;
a cross-section of each of the first and second fuel channels is circular; and
the first and second fuel channels are disposed next to a flat side of the D-shaped cross-section of the at least one coolant channel.

10. The fuel vapor separator of claim 9, wherein the heat exchanger further comprises a heat exchange fin extending into the at least one coolant channel from the flat side of the D-shaped cross-section of the at least one coolant channel.

11. The fuel vapor separator of claim 1, wherein:
the heat exchanger is at least partially disposed in the fuel reservoir; and
the at least one coolant channel is in thermal communication with the fuel reservoir.

12. The fuel vapor separator of claim 11, wherein:
the heat exchanger further comprises at least one exterior heat exchange fin extending from an exterior surface of the heat exchanger; and
the at least one exterior heat exchange fin extends into the fuel reservoir.

13. The fuel vapor separator of claim 1, further comprising:
a fuel reservoir inlet fluidly communicating with the fuel reservoir;
a fuel pump disposed at least partially in the fuel reservoir for supplying fuel from the fuel reservoir to the at least one fuel injector of the engine; and
wherein, when the fuel vapor separator is installed in an engine assembly:
the fuel reservoir inlet is fluidly connected to a fuel tank;
the inlet of the at least one fuel channel is fluidly connected to at least one fuel injector of the engine;
hot fuel coming from the at least one fuel injector of the engine passes through the heat exchanger before entering the fuel reservoir; and
fuel from the fuel tank enters into the fuel reservoir without passing through the heat exchanger.

14. A heat exchanger for a fuel vapor separator, the heat exchanger comprising:
a heat exchanger body;
a first fuel channel defined by the heat exchanger body, the first fuel channel including an inlet adapted for receiving fuel from an engine connected to the fuel vapor separator;
a second fuel channel defined by the heat exchanger body, the second fuel channel including an outlet adapted for fluidly communicating with a fuel reservoir of the fuel vapor separator,
an outlet of the first fuel channel being fluidly connected to an inlet of the second fuel channel; and
at least one coolant channel defined by the heat exchanger body,
the first fuel channel, the second fuel channel, and the at least one coolant channel being in thermal communication,
the first fuel channel, the second fuel channel and the at least one coolant channel being parallel.

15. The heat exchanger of claim 14, wherein the first and second fuel channels and the at least one coolant channel extend through a height of the heat exchanger body.

16. The heat exchanger of claim 14, further comprising at least one exterior heat exchange fin extending from an exterior surface of the heat exchanger body, the at least one exterior heat exchange fin extending into the fuel reservoir when the heat exchanger is installed in the fuel vapor separator.

17. The heat exchanger of claim 14, wherein the heat exchanger body includes at least one inner heat exchange fin extending into the at least one coolant channel.

18. The heat exchanger of claim 14, wherein the heat exchanger body is formed by extrusion.

19. A marine outboard engine, comprising:
an internal combustion engine including at least one fuel injector;
a fuel vapor separator including:
a separator body,
a fuel reservoir defined at least partially by the separator body, and
a first fuel pump fluidly connected between the fuel reservoir and the at least one fuel injector;
a fuel tank for supplying fuel to the internal combustion engine; and
a second fuel pump fluidly connected between the fuel tank and the fuel vapor separator, the fuel vapor separator further comprising:
- a heat exchanger disposed at least partially in the separator body, the heat exchanger comprising:
  - a heat exchanger body;
  - at least one fuel channel defined by the heat exchanger body, the at least one fuel channel including:
    - an inlet adapted for receiving fuel from the engine, and
    - an outlet fluidly communicating with the fuel reservoir; and
  - at least one coolant channel defined by the heat exchanger body,
    - the at least one fuel channel and the at least one coolant channel being in thermal communication.

20. The marine outboard engine of claim 19, wherein:
the second fuel pump pumps fuel from the fuel tank to fuel reservoir of the fuel vapor separator;
the first fuel pump pumps fuel from the fuel reservoir to the at least one fuel injector;
fuel returning from the at least one fuel injector flows to the fuel reservoir through the at least one fuel channel of the heat exchanger; and
coolant flows through the at least one coolant channel such that fuel flowing through the at least one fuel channel is cooled by the heat exchanger before returning to the fuel reservoir.

* * * * *